US011235773B2

(12) United States Patent
Aono et al.

(10) Patent No.: US 11,235,773 B2
(45) Date of Patent: Feb. 1, 2022

(54) CONTROL DEVICE FOR VEHICLE POWER TRANSMISSION DEVICE

(71) Applicant: TOYOTA JIDOSHA KABUSHIKI KAISHA, Toyota (JP)

(72) Inventors: Hiroyuki Aono, Nagakute (JP); Naoki Hiura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/143,043

(22) Filed: Jan. 6, 2021

(65) Prior Publication Data

US 2021/0284170 A1    Sep. 16, 2021

(30) Foreign Application Priority Data

Mar. 10, 2020  (JP) .............................. JP2020-041120

(51) Int. Cl.
*B60W 30/19* (2012.01)
*B60W 10/10* (2012.01)
*B60W 10/02* (2006.01)
*F16H 61/70* (2006.01)
*F16H 61/16* (2006.01)
*F16H 37/04* (2006.01)
*F16H 61/02* (2006.01)

(52) U.S. Cl.
CPC ............ *B60W 30/19* (2013.01); *B60W 10/02* (2013.01); *B60W 10/10* (2013.01); *F16H 61/16* (2013.01); *F16H 61/70* (2013.01); *F16H 37/042* (2013.01); *F16H 61/0265* (2013.01); *F16H 2200/0017* (2013.01); *F16H 2200/0034* (2013.01); *F16H 2200/201* (2013.01); *F16H 2200/2046* (2013.01); *F16H 2702/02* (2013.01)

(58) Field of Classification Search
CPC ...... B60W 10/02; B60W 10/10; B60W 10/11; B60W 10/119; B60W 10/14; B60W 30/19; F16H 37/042; F16H 61/16; F16H 61/70; F16H 2200/0034; F16H 2702/02; F16H 59/72; F16H 2059/746; F16H 2061/085; F16H 2306/21; F16H 2312/20
See application file for complete search history.

(56) References Cited

U.S. PATENT DOCUMENTS

2001/0004620 A1*  6/2001  Onuki ..................... F16H 63/42
                                                          477/115
2014/0007740 A1*  1/2014  Takahashi ............. B60W 10/06
                                                          74/665 A
(Continued)

FOREIGN PATENT DOCUMENTS

JP       2010209949 A     9/2010
JP       2018053941 A     4/2018

*Primary Examiner* — Edwin A Young
(74) *Attorney, Agent, or Firm* — Hunton Andrews Kurth LLP (57) ABSTRACT

An electronic control unit engages two of friction engagement elements provided in an automatic transmission in a neutral range. The electronic control unit disengages one of the two friction engagement elements engaged in the neutral range at the time of starting gear stage switching of an auxiliary transmission from a low-speed gear stage to a high-speed gear stage in the neutral range, and re-engages the friction engagement element that has been disengaged when determining that the gear stage switching has been completed.

4 Claims, 4 Drawing Sheets

(56) References Cited

U.S. PATENT DOCUMENTS

2014/0342871 A1\* 11/2014 Isomura ................ B60W 10/10
  477/5
2018/0086328 A1\* 3/2018 Arai ...................... B60W 10/06

\* cited by examiner

|  | C1 | C2 | C3 | C4 | B1 | B2 |
|---|---|---|---|---|---|---|
| DRIVE RANGE, FIRST GEAR | ◯ | ◯ | — | — | — | ◯ |
| REVERSE RANGE | — | ◯ | ◯ | — | — | ◯ |
| NEUTRAL RANGE | — | ◯ | — | — | — | ◯ |

CONTROL DEVICE FOR VEHICLE POWER TRANSMISSION DEVICE

CROSS-REFERENCE TO RELATED APPLICATION

This application claims priority to Japanese Patent Application No. 2020-041120 filed on Mar. 10, 2020, incorporated herein by reference in its entirety.

BACKGROUND

1. Technical Field

The present disclosure relates to a control device for a vehicle power transmission device including an automatic transmission and an auxiliary transmission.

2. Description of Related Art

As a control device for a vehicle power transmission device as described above, a device described in Japanese Unexamined Patent Application Publication No. 2018-53941 (JP 2018-53941 A) is known. In the automatic transmission, among a plurality of friction engagement elements provided therein, the combination of the friction engagement elements to be engaged is changed to change the gear train in accordance with the shift range and the gear stage. The automatic transmission in the neutral range is in a neutral state in which power transmission between the input shaft and the output shaft is cut off. Such a neutral state can be realized by disengaging all the friction engagement elements of the automatic transmission.

On the other hand, for switching the shift range from the neutral range at the time of starting the vehicle, some of the friction engagement elements need to be engaged. The engagement of the friction engagement elements is performed through supply of hydraulic pressure. When a plurality of friction engagement elements are engaged at the same time, the hydraulic pressure is dispersed, so it accordingly requires longer time to complete the engagement compared to the case where a single friction engagement element is engaged. In the control device of JP 2018-53941 A, the neutral range is established in a state in which some of the friction engagement elements that are engaged in the shift range used when the vehicle starts moving are engaged. Thus, by reducing the number of friction engagement elements engaged for switching the shift range from the neutral range at the time of starting the vehicle, the time required for the switching is shortened.

Further, in the control device of JP 2018-53941 A, the gear stage switching of the auxiliary transmission is performed in the neutral range. Since the friction engagement elements transmit a small amount of torque even in the disengaged state, the automatic transmission transmits some torque even in the neutral state. If the torque transmitted from the engine to the auxiliary transmission through the automatic transmission in such a neutral state, that is, so-called drag torque, is larger than a certain amount, a shock or a gear stage switching failure may occur during the gear stage switching. The drag torque is larger when some of the friction engagement elements are engaged to establish a neutral state than when all the friction engagement elements are disengaged to establish a neutral state. Therefore, in the control device described in JP 2018-53941 A, all the friction engagement elements of the automatic transmission are disengaged, and then the gear stage switching of the auxiliary transmission is performed.

SUMMARY

In such a control device of relate art, all the friction engagement elements in the automatic transmission are disengaged when the gear stage switching of the auxiliary transmission is completed. Therefore, it tends to take a long time to switch the shift range at the time of starting the vehicle immediately after performing the gear stage switching.

A control device for a vehicle power transmission device for solving the above problems is applied to a vehicle power transmission device, the vehicle power transmission device including an automatic transmission and an auxiliary transmission, the automatic transmission changing a combination of friction engagement elements to be engaged, among a plurality of friction engagement elements, to change a gear train in accordance with a shift range, and establishing a neutral range in a state where two or more of friction engagement elements are engaged in a shift range that is used at a time of starting a vehicle, and the auxiliary transmission being provided on a power transmission path between the automatic transmission and a driving wheel. The control device performs gear stage switching of the auxiliary transmission when the shift range is the neutral range. When performing the gear stage switching of the auxiliary transmission, the control device performs, at a time of starting the gear stage switching, a disengagement process of disengaging one or more friction engagement elements while maintaining engagement of one or more friction engagement elements, among the friction engagement elements that are engaged in the neutral range. Further, the control device executes a re-engagement process of re-engaging the friction engagement elements disengaged in the disengagement process when determining that the gear stage switching has been completed.

The control device for a vehicle power transmission device performs the gear stage switching of the auxiliary transmission when the shift range is the neutral range. At the time of starting the gear stage switching, the disengagement process of disengaging one or more of the friction engagement elements that are engaged in the neutral range is executed. The number of friction engagement elements engaged during the gear stage switching of the auxiliary transmission is reduced and therefore drag torque input from the automatic transmission is reduced, by the number of friction engagement elements disengaged in the disengagement process. In the disengagement process, at least one friction engagement element remains engaged. Therefore, the number of friction engagement elements that must be engaged for switching the shift range of the automatic transmission when the vehicle is started immediately after completion of the gear stage switching is reduced, compared to the case where all the friction engagement elements are disengaged during the gear stage switching. Thus, in the above control device, the time required for switching the shift range when the vehicle is started immediately after the completion of the gear stage switching of the auxiliary transmission is shortened, compared to the case where all the friction engagement elements are disengaged during the gear stage switching. Therefore, the drag torque transmitted from the automatic transmission to the auxiliary transmission during the gear stage switching can be reduced while suppressing a period of time for switching the shift range when the vehicle is started after the gear stage switching of the auxiliary transmission from becoming longer.

As the temperature of the hydraulic oil of the automatic transmission increases, the viscosity of the hydraulic oil decreases, and the drag torque transmitted from the automatic transmission to the auxiliary transmission decreases. Therefore, when the temperature of the hydraulic oil of the automatic transmission is high, the drag torque of the automatic transmission at the time of the gear stage switching of the auxiliary transmission may remain at an allowable level without execution of the disengagement process. In such a case, the disengagement process and the re-engagement process in the control device may be executed on condition that the temperature of the hydraulic oil of the automatic transmission is equal to or lower than a predetermined value.

Depending on the configuration of the auxiliary transmission, the maximum value of the drag torque of the automatic transmission with which the gear stage switching of the auxiliary transmission can be appropriately performed may differ between the case of the gear stage switching from the high-speed gear stage to the low-speed gear stage and the case of the gear stage switching from the low-speed gear stage to the high-speed gear stage. Thus, there may be a case where the gear stage switching cannot be appropriately performed unless the disengagement process is executed in one of the gear stage switching from the high-speed gear stage to the low-speed gear stage and the gear stage switching from the low-speed gear stage to the high-speed gear stage, but the gear stage switching can be appropriately performed without executing the disengagement process in the other. In such a case, the disengagement process and the re-engagement process may be executed in only one of the gear stage switching of the auxiliary transmission from the high-speed gear stage to the low-speed gear stage and the gear stage switching of the auxiliary transmission from the low-speed gear stage to the high-speed gear stage.

In the above control device, the re-engagement process is executed when it is determined that the gear stage switching has been completed. However, there is a case where the auxiliary transmission is not provided with means for directly confirming the completion of the gear stage switching. In such a case, it may be determined that the gear stage switching has been completed when a predetermined time has elapsed from the start of the gear stage switching.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of a control device for a vehicle power transmission device will be described in detail with reference to FIGS. 1 to 5.

Figure 1:
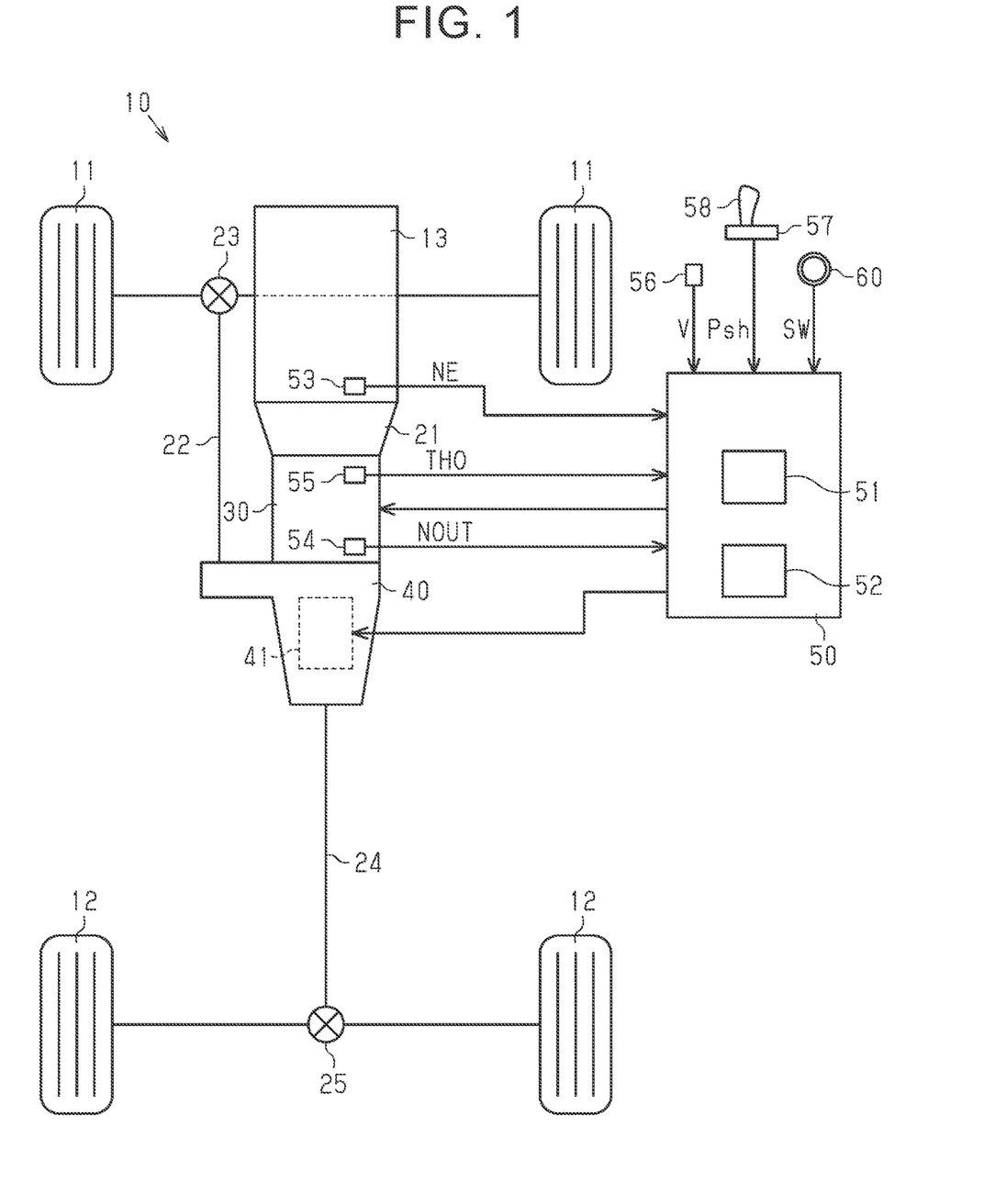
FIG. 1 is a diagram schematically showing a configuration of an embodiment of a control device for a vehicle power transmission device.

First, the configuration of the vehicle power transmission device to which the control device of the present embodiment is applied will be described with reference to FIG. 1. The vehicle power transmission device is included in a vehicle 10 that performs four-wheel drive traveling using two front wheels 11 and two rear wheels 12 as driving wheels, and performs power transmission from an engine 13 serving as a driving source of the vehicle 10 to the front wheels 11 and the rear wheels 12.

The vehicle power transmission device includes an automatic transmission 30 connected to the engine 13 via a torque converter 21. The vehicle power transmission device also includes a transfer 40 that is connected to the output side of the automatic transmission 30 and distributes power transmitted from the automatic transmission 30 to the front wheels 11 and the rear wheels 12. The transfer 40 is connected to the two front wheels 11 via a front propeller shaft 22 and a front differential 23. The transfer 40 is connected to the two rear wheels 12 via a rear propeller shaft 24 and a rear differential 25.

The transfer 40 is provided with an auxiliary transmission 41. The auxiliary transmission 41 is disposed inside the transfer 40 on a power transmission path from the automatic transmission 30 to the rear propeller shaft 24. The auxiliary transmission 41 can switch a gear stage between two gear stages, that is, a high-speed gear stage Hi and a low-speed gear stage Lo in which the power distribution ratio to the rear wheels 12 side is larger than that in the high-speed gear stage Hi. The gear stage switching of the auxiliary transmission 41 is performed by hydraulic drive.

Figure 2:
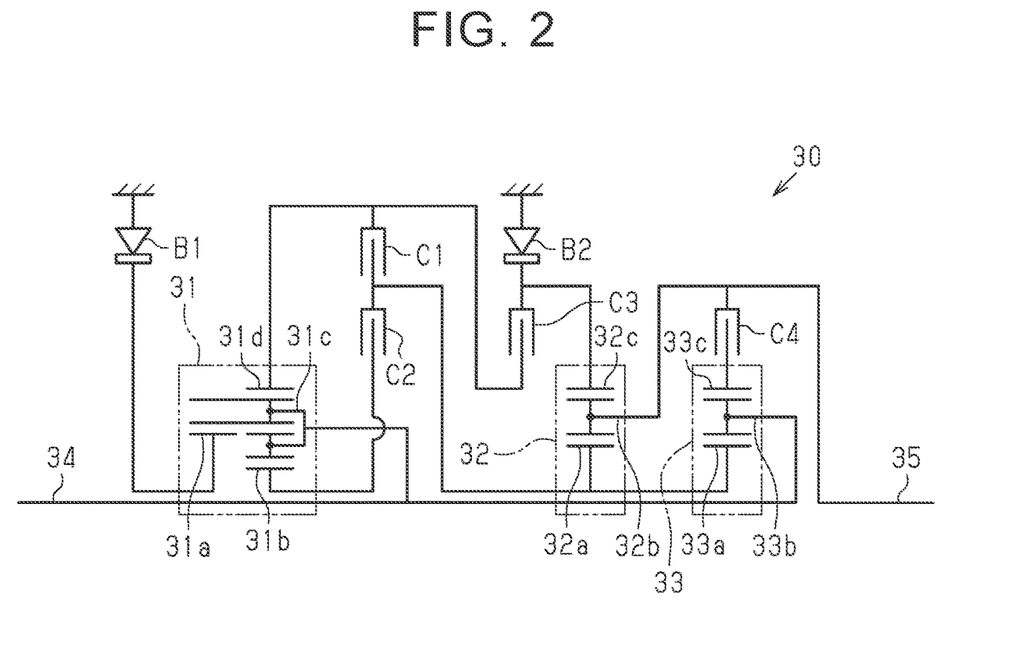
FIG. 2 is a diagram schematically showing a gear train structure of an automatic transmission provided in a vehicle power transmission device to which the control device of the embodiment is applied.

FIG. 2 shows a gear train structure of the automatic transmission 30. The automatic transmission 30 includes three planetary gear mechanisms, that is, a front planetary gear mechanism 31, a middle planetary gear mechanism 32, and a rear planetary gear mechanism 33. Further, the automatic transmission 30 has four clutches, that is, a first clutch C1, a second clutch C2, a third clutch C3, and a fourth clutch C4 as friction engagement elements. In addition, the automatic transmission 30 has two brakes, that is, a first brake B1 and a second brake B2 as friction engagement elements. The front planetary gear mechanism 31 is a planetary gear mechanism having two sun gears, that is, a large sun gear 31a and a small sun gear 31b.

An automatic transmission (AT) input shaft 34 that is an input shaft of the automatic transmission 30 connected to the engine 13 via the torque converter 21 always rotates integrally with a rotating shaft of a planetary carrier 31c of the front planetary gear mechanism 31 and a rotating shaft of a planetary carrier 33b of the rear planetary gear mechanism 33. An AT output shaft 35 that is an output shaft of the automatic transmission 30 connected to the transfer 40 always rotates integrally with a rotating shaft of a planetary carrier 32b of the middle planetary gear mechanism 32. Further, a sun gear 32a of the middle planetary gear mechanism 32 and a sun gear 33a of the rear planetary gear mechanism 33 share a rotating shaft and always rotate integrally.

When the friction engagement elements are engaged in the automatic transmission 30, the following states are obtained. That is, when the first clutch C1 is engaged, a rotating shaft of a ring gear 31*d* of the front planetary gear mechanism 31 and the rotating shafts of the sun gears 32*a* and 33*a* of the middle planetary gear mechanism 32 and the rear planetary gear mechanism 33 rotate integrally. When the second clutch C2 is engaged, a rotating shaft of the small sun gear 31*b* of the front planetary gear mechanism 31 and the rotating shafts of the sun gears 32*a* and 33*a* of the middle planetary gear mechanism 32 and the rear planetary gear mechanism 33 rotate integrally. When the third clutch C3 is engaged, the rotating shaft of the ring gear 31*d* of the front planetary gear mechanism 31 and the rotating shaft of the ring gear 32*c* of the middle planetary gear mechanism 32 rotate integrally. When the fourth clutch C4 is engaged, the rotating shaft of the planetary carrier 32*b* of the middle planetary gear mechanism 32 and the rotating shaft of the ring gear 33*c* of the rear planetary gear mechanism 33 rotate integrally. When the first brake B1 is engaged, the rotation of a rotating shaft of the large sun gear 31*a* of the front planetary gear mechanism 31 is locked. When the second brake B2 is engaged, the rotation of the rotating shaft of the ring gear 32*c* of the middle planetary gear mechanism 32 is locked. The automatic transmission 30 changes the combination of the friction engagement elements to be engaged, among the four clutches C1 to C4 and the two brakes B1 and B2, thereby changing the gear train in accordance with each shift range or each gear stage of the drive range.

Figure 3:
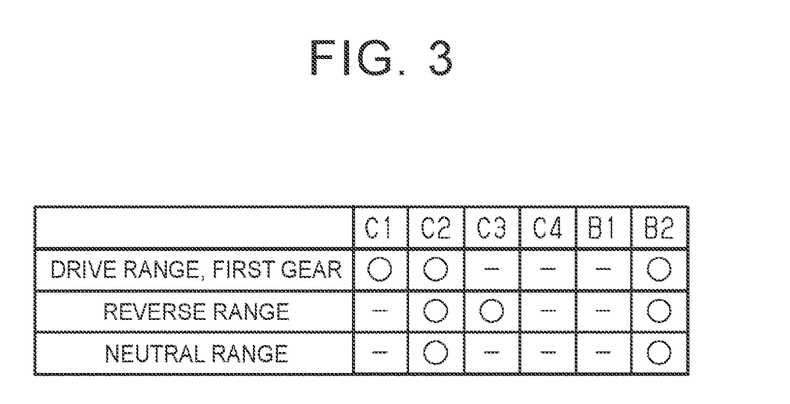
FIG. 3 is a table showing engagement states of friction engagement elements of the automatic transmission in first gear of a drive range, a reverse range, and a neutral range.

FIG. 3 shows combinations of the friction engagement elements of the automatic transmission 30 that are engaged in the respective states of first gear of the drive range, a reverse range, and a neutral range. In the table of FIG. 3, sign "∘" indicates the engaged state, and sign "–" indicates the state in which engagement is released, that is, the disengaged state.

As shown in FIG. 3, in first gear of the drive range, three friction engagement elements, that is, the first clutch C1, the second clutch C2, and the second brake B2 are engaged. In the reverse range, three friction engagement elements, that is, the second clutch C2, the third clutch C3, and the second brake B2 are engaged. In the neutral range, two friction engagement elements, that is, the second clutch C2 and the second brake B2 are engaged.

The automatic transmission 30 in the neutral range is in the neutral state in which power transmission between the AT input shaft 34 and the AT output shaft 35 is cut off. The neutral state of the automatic transmission 30 can be realized without engaging the second clutch C2 and the second brake B2, that is, realized with all the friction engagement elements of the automatic transmission 30 disengaged. When all the friction engagement elements are thus disengaged in the neutral range, three friction engagement elements need to be engaged in order to bring the automatic transmission 30 into the reverse range or first gear of the drive range from that state. Engagement of the friction engagement elements is performed by applying hydraulic pressure. When a plurality of friction engagement elements are engaged at the same time, the hydraulic pressure is dispersed, so that time required to complete the engagement becomes long. However, the automatic transmission 30 can be brought into the neutral state when only the second clutch C2 and the second brake B2 are engaged, and also, shifting to the reverse range and first gear of the drive range is possible when the remaining one of the friction engagement elements is engaged. Therefore, in the present embodiment, by engaging the second clutch C2 and the second brake B2 in the neutral range, time for shifting to first gear of the drive range or the reverse range is shortened.

Next, the configuration of the control device of the present embodiment will be described with reference to FIG. 1. The control device of the present embodiment is configured as an electronic control unit 50 including an arithmetic processing circuit 51 that executes an arithmetic process for controlling the vehicle power transmission device and a storage device 52 in which control programs and data are stored in advance. The electronic control unit 50 receives detection signals of various sensors provided in various parts of the vehicle 10. For example, a detection signal of an engine speed NE is input from an engine speed sensor 53 installed in the engine 13. A detection signal of an output shaft rotation speed NOUT that is the rotation speed of the AT output shaft 35 is input from an output shaft rotation speed sensor 54 installed in the automatic transmission 30. Further, a detection signal of an AT oil temperature THO that is the temperature of the hydraulic oil of the automatic transmission 30 is input from an oil temperature sensor 55 installed in the automatic transmission 30. In addition, a detection signal of a vehicle speed V that is the traveling speed of the vehicle 10 is input from a vehicle speed sensor 56, and a detection signal of a shift position Psh that is the operation position of a shift lever 58 is input from a shift position sensor 57.

The vehicle 10 is provided with a gear stage switch 60 that is a switch for the gear stage switching of the auxiliary transmission 41. The gear stage switch 60 has operation positions corresponding to the high-speed gear stage Hi and the low-speed gear stage Lo. The gear stage switch 60 is locked except for the case that the shift lever 58 is at the operation position in the neutral range and the vehicle speed V is zero, and switching of the operation position is prohibited. The electronic control unit 50 receives an input of an operation signal SW indicating the operation position of the gear stage switch 60 from the gear stage switch 60. In the following description, the value of the operation signal SW when the operation position of the gear stage switch 60 is at a position corresponding to the high-speed gear stage Hi is referred to as "Hi" and the value of the operation signal SW when the operation position of the gear stage switch 60 is at a position corresponding to the low-speed gear stage Lo is referred to as "Lo".

The electronic control unit 50 performs shift control for the automatic transmission 30 based on the detection signals such as the shift position Psh, the vehicle speed V, and the engine rotation speed NE. The electronic control unit 50 also executes processes related to the gear stage switching of the auxiliary transmission 41 based on the operation signal SW of the gear stage switch 60 and the like.

Figure 4:
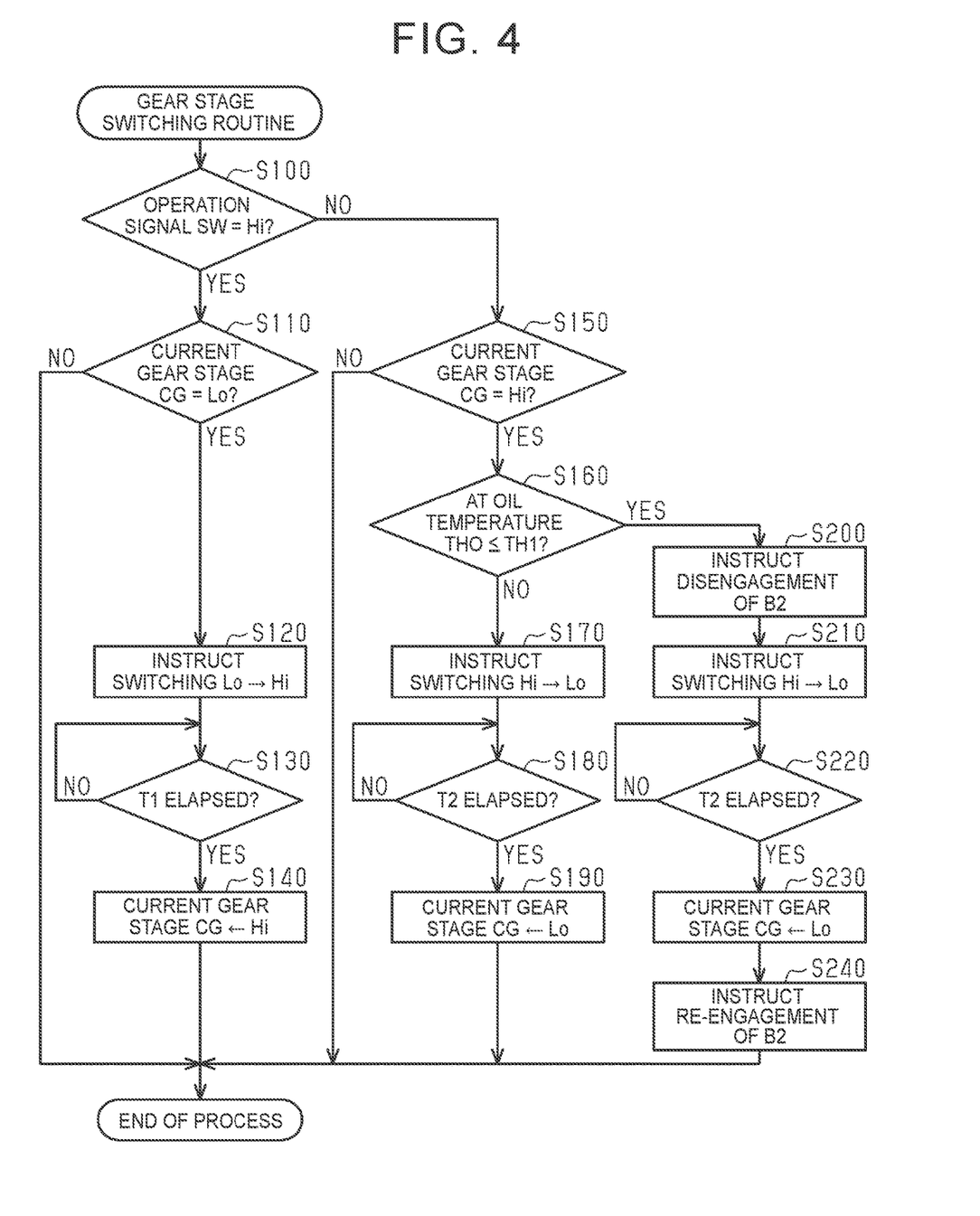
FIG. 4 is a flowchart of a gear stage switching routine executed by the control device of the embodiment.

FIG. 4 shows a flowchart of a gear stage switching routine executed by the electronic control unit 50 for the gear stage switching of the auxiliary transmission 41. The electronic control unit 50 repeatedly executes the process of the routine at every predetermined control cycle.

When the process of the routine is started, first, in step S100, whether the value of the operation signal SW of the gear stage switch 60 is "Hi" is determined. When the value of the operation signal SW is "Hi" (YES), the process proceeds to step S110. Otherwise, that is, when the value of the operation signal SW is "Lo" (NO), the process proceed to step S150.

When the value of the operation signal SW is "Hi" and the process proceeds to step S110, whether the value of a current gear stage CG that is a variable indicating the current gear stage of the auxiliary transmission 41 is the value "Lo" indicating the low-speed gear stage is determined in step S110. When the value of the current gear stage CG is "Lo" (YES), the process proceeds to step S120. When the value of the current gear stage CG is not "Lo" (NO), that is, the values of the operation signal SW and the current gear stage CG are both the value "Hi" indicating the high-speed gear stage and the gear stage switching of the auxiliary transmission 41 is not necessary, the process of the routine of this time is directly terminated.

When the process proceeds to step S120, the auxiliary transmission 41 is instructed, in step S120, to perform the gear stage switching from the low-speed gear stage Lo to the high-speed gear stage Hi. In the auxiliary transmission 41, the gear stage switching from the low-speed gear stage Lo to the high-speed gear stage Hi is started in response to this instruction. It should be noted that in the present embodiment, it is determined that the gear stage switching from the low-speed gear stage Lo to the high-speed gear stage Hi in the auxiliary transmission 41 is completed based on the fact that a predetermined time T1 has elapsed from the issuance of the instruction. When it is determined that the gear stage switching is completed (S130: YES), the process proceeds to step S140. Then, after the value of the current gear stage CG is changed from "Lo" to "Hi" in step S140, the process of the routine of this time is ended.

The following time is set as the above time T1. The time required for the gear stage switching of the auxiliary transmission 41 from the low-speed gear stage Lo to the high-speed gear stage Hi has variations due to the AT oil temperature THO, individual differences or temporal change of the auxiliary transmission 41. The maximum value of the range of variation of the required time is set as the value of the time T1.

On the other hand, when the value of the operation signal SW is "Lo" and the process proceeds to step S150, whether the value of the current gear stage CG is "Hi" is determined in step S150. When the value of the current gear stage CG is "Hi" (YES), the process proceeds to step S160. When the value of the current gear stage CG is not "Hi" (NO), that is, the values of the operation signal SW and the current gear stage CG are both the value "Lo" indicating the low-speed gear stage and the gear stage switching of the auxiliary transmission 41 is not necessary, the process of the routine of this time is directly terminated.

When the process proceeds to step S160, whether the AT oil temperature THO is equal to or lower than the predetermined temperature TH1 is determined in step S160. When the AT oil temperature THO is equal to or lower than "TH1" (YES), the process proceeds to step S200, and when the AT oil temperature THO exceeds "TH1" (NO), the process proceeds to step S170.

When the AT oil temperature THO exceeds "TH1" and the process proceeds to step S170, the auxiliary transmission 41 is instructed, in step S170, to perform the gear stage switching from the high-speed gear stage Hi to the low-speed gear stage Lo. In the auxiliary transmission 41, the gear stage switching from the high-speed gear stage Hi to the low-speed gear stage Lo is started in response to this instruction.

It should be noted that in the present embodiment, it is determined that the gear stage switching from the high-speed gear stage Hi to the low-speed gear stage Lo in the auxiliary transmission 41 is completed based on the fact that a predetermined time T2 has elapsed from the issuance of the instruction. The maximum value of the range of variation of the time required for the gear stage switching of the auxiliary transmission 41 from the high-speed gear stage Hi to the low-speed gear stage Lo is set as the value of the time T2. Depending on the configuration of the auxiliary transmission 41, the time T2 may be the same as the time T1 or may be different from the time T1.

When it is determined that the time T2 has elapsed after the instruction of the gear stage switching in step S170 and the gear stage switching is completed (S180: YES), the process proceeds to step S190. After the value of the current gear stage CG is changed from "Hi" to "Lo" in step S190, the process of the routine of this time is ended.

On the other hand, when the AT oil temperature THO is equal to or lower than "TH1" and the process proceeds to step S200, the automatic transmission 30 is instructed in step S200, to perform disengagement of the second brake B2. Then, in the next step S210, the auxiliary transmission 41 is instructed to perform the gear stage switching from the high-speed gear stage Hi to the low-speed gear stage Lo. When it is determined that the predetermined time T2 has elapsed after the instruction and the gear stage switching is completed (S220: YES), the process proceeds to step S230, and in step S230, the value of the current gear stage CG is changed from "Hi" to "Lo". Further, in this case, in the subsequent step S240, the automatic transmission 30 is instructed to perform re-engagement of the second brake B2, and then the process of the routine of this time is ended.

Operations and effects of the present embodiment will be described. In the present embodiment, the gear stage switching of the auxiliary transmission 41 is performed, in the state in which the shift range is set to the neutral range, the vehicle speed V is zero, and almost no torque is input to the transfer 40 from the automatic transmission 30 side, the front wheels 11 side, and the rear wheels 12 side. However, the friction engagement elements of the automatic transmission 30 transmit a small amount of torque even when being disengaged. Therefore, even when the shift range is in the neutral range, that is, in the neutral state in which the power transmission between the AT input shaft 34 and the AT output shaft 35 is cut off, a small amount of torque is transmitted from the engine 13 to the transfer 40 via the automatic transmission 30. When the torque transmitted through the automatic transmission 30 in the neutral state, namely, the drag torque is larger than a certain amount, a shock or a switching failure may occur at the time of the gear stage shifting of the auxiliary transmission 41.

Figure 5:
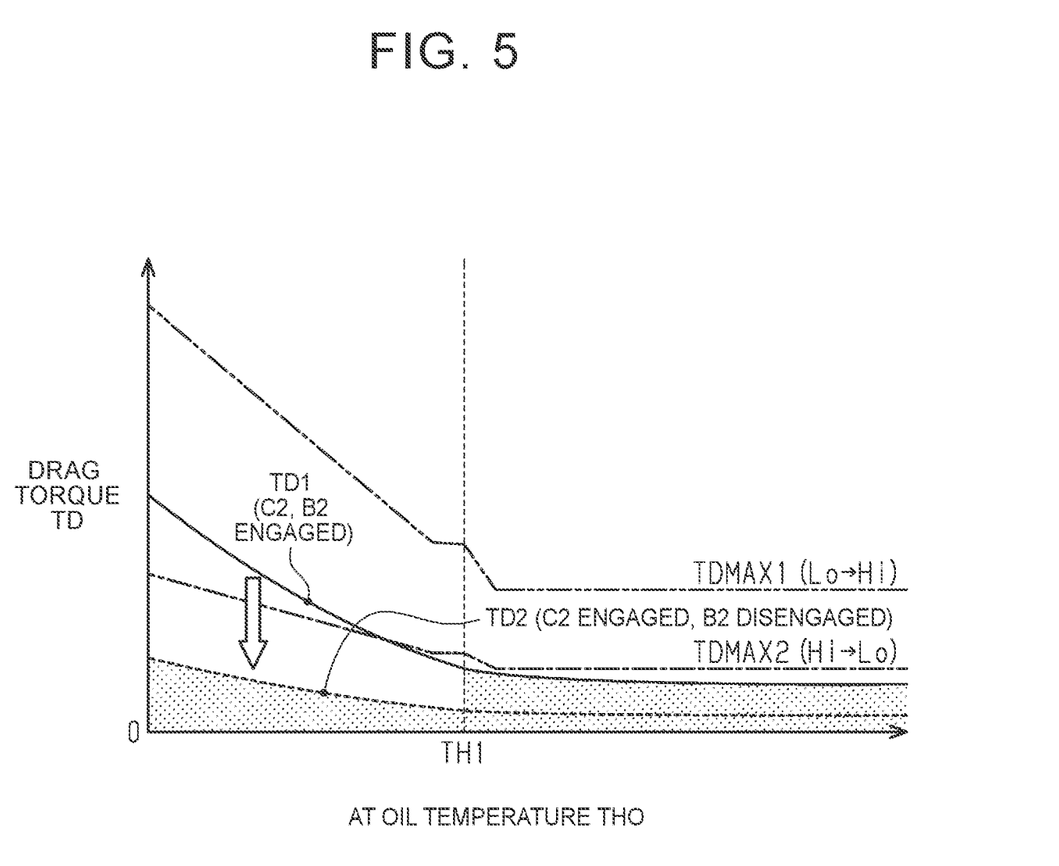
FIG. 5 is a graph showing a relationship between drag torque and an automatic transmission (AT) oil temperature.

FIG. 5 shows how a drag torque TD1 and a drag torque TD2 change with the AT oil temperature THO. The drag torque TD1 is a torque generated when the second clutch C2 and the second brake B2 are both engaged. The drag torque TD2 is a torque generated when the second clutch C2 is engaged and the second brake B2 is disengaged. The range of the AT oil temperature THO shown in FIG. 5 is the use range of the AT oil temperature THO assumed at the time of design.

When the AT oil temperature THO decreases, the viscosity of the hydraulic oil increases and the drag torques TD1 and TD2 increase. Further, the drag torque TD decreases as the number of engaged friction engagement elements decreases. Therefore, the drag torque TD1 takes a larger value than the drag torque TD2 at the same AT oil temperature THO.

FIG. 5 also shows a relationship between a maximum allowable drag torque TDMAX1 at the time of switching from the high-speed gear stage Hi to the low-speed gear stage Lo, a maximum allowable drag torque TDMAX2 at the time of switching from the low-speed gear stage Lo to the high-speed gear stage Hi, and the AT oil temperature THO. The maximum allowable drag torques TDMAX1 and TDMAX2 represent the maximum values of the drag torque TD with which respective gear stage switching thereof can be smoothly performed. When the AT oil temperature THO is low and the viscosity of the hydraulic oil is high, the operation speed of the gear stage switching of the auxiliary transmission 41 by hydraulic drive becomes slow, so that a shock or a switching failure due to the input of the drag torque TD during the switching is less likely to occur. Therefore, the maximum allowable drag torques TDMAX1 and TDMAX2 are set to take larger values when the AT oil temperature THO is low than when the AT oil temperature THO is high. In the present embodiment, due to the mechanism of the auxiliary transmission 41, the maximum allowable drag torque TDMAX1 takes a larger value than the maximum allowable drag torque TDMAX2, as long as the AT oil temperature THO is the same.

As shown in FIG. 5, at the AT oil temperature THO within the use range, the drag torque TD1 does not exceed the maximum allowable drag torque TDMAX2. Therefore, the switching from the low-speed gear stage Lo to the high-speed gear stage Hi can be smoothly performed regardless of the AT oil temperature THO. When the AT oil temperature THO is equal to or lower than a certain temperature, the drag torque TD1 in the state where the second clutch C2 and the second brake B2 are engaged exceeds the maximum allowable drag torque TDMAX1. Thus, when the AT oil temperature THO is equal to or lower than the certain temperature, in the state where the second clutch C2 and the second brake B2 of the automatic transmission 30 are both engaged, a shock or a switching failure may occur at the time of the gear stage switching of the auxiliary transmission 41 from the high-speed gear stage Hi to the low-speed gear stage Lo. The temperature TH1 is set to a temperature higher than the highest value of the range of the AT oil temperature THO, within which the drag torque TD1 exceeds the maximum allowable drag torque TDMAX2.

In the present embodiment, the switching from the low-speed gear stage Lo to the high-speed gear stage Hi is performed with the second clutch C2 and the second brake B2 engaged regardless of the AT oil temperature THO. Further, when the AT oil temperature THO exceeds the predetermined temperature TH1, the switching from the high-speed gear stage Hi to the low-speed gear stage Lo is also performed with the second clutch C2 and the second brake B2 engaged.

When the switching from the high-speed gear stage Hi to the low-speed gear stage Lo is performed with the AT oil temperature THO being equal to or lower than the predetermined temperature TH1, the gear stage switching is started after disengaging the second brake B2. Then, the second brake B2 is re-engaged after it is determined that the gear stage switching has been completed. In this case, the friction engagement element of the automatic transmission 30 that is engaged during the gear stage switching is only the second clutch C2. Therefore, even when the AT oil temperature THO is low, the switching from the high-speed gear stage Hi to the low-speed gear stage Lo is performed with the drag torque TD being less than the maximum allowable drag torque TDMAX2. That is, in this case, the disengagement process of disengaging the second brake B2 while maintaining the engagement of the second clutch C2, of the two friction engagement elements engaged in the neutral range, is executed at the time of starting the gear stage switching. Further, in this case, a re-engagement process of re-engaging the second brake B2 that has been disengaged in the disengagement process is executed when it is determined that the gear stage switching has been completed.

When both the second clutch C2 and the second brake B2 are disengaged, it is possible to reduce the drag torque TD during the gear stage switching of the auxiliary transmission 41 compared to the case where only the second brake B2 is disengaged. However, in such a case, three friction engagement elements need to be engaged when shifting from the state in which the gear stage switching is completed to first gear of the drive range or the reverse range, so the time required for shifting becomes long.

In this respect, in the present embodiment, the disengagement process and re-engagement process are executed only when the AT oil temperature THO is equal to or lower than the predetermined temperature TH1 and the switching from the high-speed gear stage Hi to the low-speed gear stage Lo is performed. Therefore, when the AT oil temperature THO exceeds the predetermined temperature TH1, or when the AT oil temperature THO is equal to or lower than the predetermined temperature TH1 but the switching from the low-speed gear stage Lo to the high-speed gear stage Hi is performed, the gear stage switching is performed with both the second clutch C2 and the second brake B2 engaged. In these cases, it is possible to complete the shifting to first gear of the drive range or the reverse range by engaging only one friction engagement element. Also, when the disengagement process and the re-engagement process are executed, only the second brake B2 is disengaged during the gear stage switching and the engagement of the second clutch C2 is maintained. Thus, also in this case, the shifting to first gear of the drive range or the reverse range can be completed by engaging the two friction engagement elements. Therefore, in either case, the time required for switching the shift range at the time of starting the vehicle 10 immediately after the gear stage switching is completed is shortened, compared to the case where both the second clutch C2 and the second brake B2 are disengaged during the gear stage switching.

With the control device for a vehicle power transmission device of the present embodiment, the following effects can be achieved.

(1) In the present embodiment, at the time of starting the gear stage switching of the auxiliary transmission 41, the disengagement process of disengaging the second brake B2 is executed while the engagement of the second clutch C2, of the second brake B2 and the second clutch C2 that are engaged in the neutral range, is maintained. Further, the re-engagement process of re-engaging the second brake B2 that has been disengaged in the disengagement process is executed when it is determined that the gear stage switching of the auxiliary transmission 41 has been completed. Therefore, the drag torque TD transmitted from the automatic transmission 30 to the auxiliary transmission 41 during the gear stage switching can be reduced while suppressing a period of time for switching the shift range when the vehicle 10 is started after the gear stage switching of the auxiliary transmission 41 from becoming longer.

(2) In the present embodiment, the disengagement process and the re-engagement process are executed only when the oil temperature is low, in which the drag torque TD becomes large. That is, when the AT oil temperature THO is high and the drag torque TD transmitted from the automatic transmission 30 to the auxiliary transmission 41 during the gear stage switching remains at an allowable level without disengagement of the second brake B2, the gear stage switching of the auxiliary transmission 41 is performed with the second brake B2 engaged. Thus, it is possible to suppress the period of time for switching the shift range when the vehicle 10 is started after the gear stage switching from becoming unnecessarily long for realizing good gear stage switching.

(3) In the present embodiment, of the switching from the high-speed gear stage Hi to the low-speed gear stage Lo and the switching from the low-speed gear stage Lo to the high-speed gear stage Hi, only in the former case with a smaller maximum allowable drag torque, the disengagement process and the re-engagement process are executed. Thus, it is possible to suppress the period of time for switching the shift range when the vehicle 10 is started after the gear stage switching from becoming unnecessarily long for realizing good gear stage switching.

(4) In the present embodiment, when the predetermined time T1, T2 has elapsed after the start of the gear stage switching, it is determined that the gear stage switching is completed and the re-engagement process is executed. Thus, the re-engagement process can be executed at an appropriate timing even when means for directly detecting the completion of the gear stage switching of the auxiliary transmission 41 is not provided.

The present embodiment can be modified and implemented as follows. The present embodiment and modifications to be described below may be carried out in combination within a technically consistent range.

In the above embodiment, it is determined that the gear stage switching has been completed when the predetermined time T1, T2 has elapsed from the start of the gear stage switching of the auxiliary transmission 41. When the means for directly detecting a state of the gear stage of the auxiliary transmission 41 is provided, the completion of the gear stage switching may be determined from the detection result.

The disengagement process and the re-engagement process are executed only at the time of switching from the high-speed gear stage Hi to the low-speed gear stage Lo. Note that, depending on the configuration of the auxiliary transmission 41, the maximum allowable drag torque TDMAX2 may be larger at the time of switching from the low-speed gear stage Lo to the high-speed gear stage Hi than at the time of switching from the high-speed gear stage Hi to the low-speed gear stage Lo. In such a case, the disengagement process and the re-engagement process may be executed only at the time of switching from the high-speed gear stage Hi to the low-speed gear stage Lo.

Depending on the configuration of the power transmission device including the auxiliary transmission 41, the drag torque TD1 generated when the second clutch C2 and the second brake B2 are engaged may exceed both the maximum allowable drag torques TDMAX1 and TDMAX2. In such a case, the disengagement process and the re-engagement process may be executed both at the time of switching from the high-speed gear stage Hi to the low-speed gear stage Lo and at the time of switching from the low-speed gear stage Lo to the high-speed gear stage Hi.

In the above embodiment, the disengagement process and the re-engagement process are executed on condition that the AT oil temperature THO is equal to or lower than the predetermined temperature TH1. However, both the processes may be executed regardless of the AT oil temperature THO.

As the auxiliary transmission 41, a transmission in which switching is performed among three or more gear stages may be adopted. When three or more friction engagement elements of the automatic transmission 30 are engaged in the neutral range, one or more friction engagement elements may be disengaged while maintaining engagement of one or more friction engagement elements in the disengagement process, and the friction engagement elements that are disengaged in the disengagement process may be re-engaged in the re-engagement process. In any case, in the automatic transmission that establishes the neutral range in the state where some of the frictional engagement elements engaged in the shift range that is used when the vehicle is started are engaged, the disengagement process and the re-engagement process are executed at the time of the gear stage switching of the auxiliary transmission 41, so that the effects described in above (1) can be obtained.

What is claimed is:

1. A control device for a vehicle power transmission device,
the control device being applied to the vehicle power transmission device, the vehicle power transmission device including an automatic transmission and an auxiliary transmission, the automatic transmission changing a combination of friction engagement elements to be engaged, among a plurality of friction engagement elements, to change a gear train in accordance with a shift range, and establishing a neutral range in a state where two or more of friction engagement elements are engaged in a shift range that is used at a time of starting a vehicle, and the auxiliary transmission being provided on a power transmission path between the automatic transmission and a driving wheel,
the control device performing gear stage switching of the auxiliary transmission when the shift range is the neutral range, and
the control device executing, at a time of starting the gear stage switching, a disengagement process of disengaging one or more friction engagement elements while maintaining engagement of one or more friction engagement elements, among the friction engagement elements that are engaged in the neutral range, and executing a re-engagement process of re-engaging the friction engagement elements disengaged in the disengagement process when determining that the gear stage switching has been completed.

2. The control device according to claim 1, wherein the disengagement process and the re-engagement process are executed on condition that a temperature of hydraulic oil of the automatic transmission is equal to or lower than a predetermined value.

3. The control device according to claim 1, wherein the disengagement process and the re-engagement process are executed in only one of gear stage switching of the auxiliary transmission from a high-speed gear stage to a low-speed gear stage and gear stage switching of the auxiliary transmission from the low-speed gear stage to the high-speed gear stage.

4. The control device according to claim 1, wherein the control device determines that the gear stage switching has been completed when a predetermined time has elapsed from a start of the gear stage switching.

* * * * *